(12) United States Patent
Garin (10) Patent No.: US 8,949,025 B2
(45) Date of Patent: Feb. 3, 2015

(54) GNSS POSITIONING USING PRESSURE SENSORS

(75) Inventor: Lionel J. Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 650 days.

(21) Appl. No.: 12/599,258

(22) PCT Filed: Jun. 4, 2008

(86) PCT No.: PCT/EP2008/056906
§ 371 (c)(1),
(2), (4) Date: Nov. 6, 2009

(87) PCT Pub. No.: WO2008/148794
PCT Pub. Date: Dec. 11, 2008

(65) Prior Publication Data
US 2010/0204916 A1 Aug. 12, 2010

Related U.S. Application Data

(60) Provisional application No. 60/942,920, filed on Jun. 8, 2007.

(51) Int. Cl.
*G01S 19/45* (2010.01)
*G01C 21/26* (2006.01)
*G01S 19/22* (2010.01)

(52) U.S. Cl.
CPC ........ *G01S 19/22* (2013.01); *G01S 19/45* (2013.01)
USPC ........................ 701/532; 701/208; 342/357.28

(58) Field of Classification Search
CPC ......... G01S 19/22; G01S 19/45; G01S 19/34; G01S 19/37; G01S 19/47; G01S 19/50; G01S 19/14; G01S 19/39; G01C 5/00; G01C 21/20; G01C 5/06; G01C 5/005; G01C 21/367; G01C 21/28; H04B 1/10
USPC ......... 342/357.28, 357.3, 357.48; 701/208, 4, 701/11, 45, 46, 457, 475, 532, 472; 702/150; 280/734, 735, 736, 738; 375/350

See application file for complete search history.

(56) References Cited

U.S. PATENT DOCUMENTS 4,750,197 A  6/1988 Denekamp et al.
5,210,540 A * 5/1993 Masumoto ............... 342/357.28

(Continued)

FOREIGN PATENT DOCUMENTS

CN 1677059 A 10/2005
CN 1916638 A 2/2007

(Continued)

OTHER PUBLICATIONS

International Search Report and Written Opinion—PCT/EP2008/056906, International Search Authority—European Patent Office—Apr. 14, 2009.

(Continued)

*Primary Examiner* — Tuan C. To
*Assistant Examiner* — Yuri Kan
(74) *Attorney, Agent, or Firm* — Linda G. Gunderson (57) ABSTRACT

Systems, methods and devices for improving the accuracy of GNSS data are provided. Specifically, embodiments of the invention can advantageously use sensor input to improve the accuracy of position fixes. The use of physical sensors in navigation systems is deemed particularly advantageous, especially where altitude data derived from the pressure sensor is calibrated with and/or blended with GNSS altitude data.

22 Claims, 6 Drawing Sheets

(56) References Cited

U.S. PATENT DOCUMENTS

| | | | |
|---|---|---|---|
| 5,265,025 A | | 11/1993 | Hirata |
| 5,646,857 A | * | 7/1997 | McBurney et al. ............ 701/475 |
| 5,877,696 A | | 3/1999 | Powell |
| 5,897,605 A | | 4/1999 | Kohli et al. |
| 5,939,982 A | | 8/1999 | Gagnon et al. |
| 6,041,280 A | | 3/2000 | Kohli et al. |
| 6,061,018 A | | 5/2000 | Sheynblat |
| 6,125,325 A | | 9/2000 | Kohli |
| 6,216,064 B1 | * | 4/2001 | Johnson et al. ................... 701/4 |
| 6,236,937 B1 | | 5/2001 | Kohli |
| 6,289,280 B1 | | 9/2001 | Fernandez-Corbaton et al. |
| 6,292,749 B2 | | 9/2001 | Kohli |
| 6,400,753 B1 | | 6/2002 | Kohli et al. |
| 6,421,609 B2 | | 7/2002 | Kohli |
| 6,466,161 B2 | | 10/2002 | Turetzky et al. |
| 6,574,558 B2 | | 6/2003 | Kohli |
| 6,756,983 B1 | | 6/2004 | Borosh |
| 6,774,762 B2 | | 8/2004 | Bates |
| 6,836,667 B1 | | 12/2004 | Smith, Jr. |
| 6,927,688 B2 | | 8/2005 | Tice |
| 7,129,837 B2 | | 10/2006 | Shannon et al. |
| 7,333,015 B2 | | 2/2008 | Ekstrom |
| 7,342,497 B2 | | 3/2008 | Chung et al. |
| 7,356,835 B2 | | 4/2008 | Gancarcik et al. |
| 7,427,918 B2 | | 9/2008 | Fano |
| 7,522,043 B2 | | 4/2009 | English et al. |
| 7,623,029 B2 | | 11/2009 | Meyers |
| 2002/0017977 A1 | | 2/2002 | Wall |
| 2004/0012502 A1 | | 1/2004 | Rasmussen |
| 2004/0054470 A1 | * | 3/2004 | Farine et al. .................. 701/213 |
| 2004/0056767 A1 | | 3/2004 | Porter |
| 2004/0257225 A1 | | 12/2004 | Webb, Sr. |
| 2005/0222758 A1 | * | 10/2005 | Ichida ............................ 701/208 |
| 2005/0276363 A1 | * | 12/2005 | Joublin et al. ................. 375/350 |
| 2006/0055564 A1 | | 3/2006 | Olsen et al. |
| 2006/0100781 A1 | * | 5/2006 | Lin et al. ....................... 701/216 |
| 2006/0220842 A1 | | 10/2006 | Breed |
| 2006/0232052 A1 | * | 10/2006 | Breed ............................ 280/735 |
| 2007/0013519 A1 | | 1/2007 | Chung et al. |
| 2007/0050101 A1 | * | 3/2007 | Sacle et al. ....................... 701/11 |
| 2007/0228703 A1 | * | 10/2007 | Breed ............................ 280/735 |
| 2007/0268135 A1 | | 11/2007 | Morhard et al. |
| 2008/0067792 A1 | * | 3/2008 | Breed ............................ 280/734 |
| 2008/0082237 A1 | * | 4/2008 | Breed ............................. 701/45 |
| 2008/0129493 A1 | | 6/2008 | Fuentes et al. |
| 2008/0147280 A1 | * | 6/2008 | Breed ............................. 701/46 |
| 2008/0231438 A1 | | 9/2008 | Curcio |
| 2008/0243342 A1 | * | 10/2008 | Breed ............................. 701/45 |
| 2008/0252450 A1 | | 10/2008 | Wandel |
| 2008/0272580 A1 | * | 11/2008 | Breed ............................ 280/735 |
| 2008/0277911 A1 | * | 11/2008 | Breed ............................ 280/738 |
| 2008/0284145 A1 | * | 11/2008 | Breed ............................ 280/736 |
| 2008/0303663 A1 | | 12/2008 | Smith et al. |
| 2009/0096669 A1 | * | 4/2009 | Garin ......................... 342/357.12 |
| 2010/0204916 A1 | * | 8/2010 | Garin ............................ 701/208 |
| 2011/0046915 A1 | * | 2/2011 | Hol et al. ...................... 702/150 |

FOREIGN PATENT DOCUMENTS

| | | |
|---|---|---|
| DE | 10044393 A1 | 4/2002 |
| JP | 4369492 | 12/1992 |
| JP | 11345374 A | 12/1999 |
| JP | 2000167208 A | 6/2000 |
| JP | 2001014504 A | 1/2001 |
| JP | 2001194169 A | 7/2001 |
| JP | 2001325245 A | 11/2001 |
| JP | 2003075172 A | 3/2003 |
| JP | 2004500573 A | 1/2004 |
| JP | 2005538000 A | 12/2005 |
| JP | 2007022782 A | 2/2007 |

OTHER PUBLICATIONS

Jani Kappi and Kimmo Alanen, "Pressure Altitude Enhanced AGNSS Hybrid Receiver for a Mobile Terminal," Proceedings of Ion GNSS 2005, Sep. 13, 2005, pp. 1991-1997, XP002521800 Long Beach, CA, USA.

Lionel J. Garin et al, "Enhancing Altitude Accuracy in Automotive Navigation Using MEMS Barometric Sensor with GPS," Proceedings of the 2008 National Technical Meeting of the Institute of Navigation, Jan. 28, 2008, pp. 670-679, XP002521801, San Diego, CA, USA.

E. Schwartz, "GE completes trial of smart shipping containers," InfoWorld, Jan. 11, 2005, http://www.infoworld.com/article/05/01/11/HNge 1.html? INTRUSI, Jun. 25, 2007, 4 pages.

J.J. Hopkins, "Integrated Satellite Navigation and Strapdown Attitude and Heading References for Civil Air Carriers," Presented at ION Space Meeting, Apr. 1981, pp. 95-104.

K. Kovach et al., "PPS RAIM Algorithms and Their Performance," Journal of the Institute of Navigation, vol. 42, No. 3, Fall 1995, pp. 179-193.

Karen L. Van Dyke, "RAIM Availability for Supplemental GPS Navigation", Journal of the Institute of Navigation, vol. 39, No. 4, 1992-1993, pp. 139-153.

Lawrence Vallot et al., "Design and Flight Test of Differential GPS/Inertial Navigation System for Approach/Landing Guidance", Journal of the Institute of Navigation, vol. 38, No. 2, 1991, pp. 321-340.

M. Brenner, "Implementation of a RAIM Monitor in a GPS Receiver and an Integrated GPS/IRS," Proceedings of ION GPS-90, Satellite Division Technical Meeting, Sep. 1990, pp. 317-337.

M. Brenner, "Integrated GPS/Inertial Fault Detection Availability," Journal of the Institute of Navigation, vol. 43, No. 2, Summer 1996, pp. 339-358.

R. Grover Brown, "A Baseline GPS RAIM Scheme and a Note on the Equivalence of Three RAIM Methods", Journal of the Institute of Navigation, vol. 39, No. 3, 1992, pp. 101-116.

Young C. Lee, "RAIM Availability for GPS Augmented with Barometric Altimeter Aiding and Clock Coasting", Journal of the Institute of Navigation, vol. 40, No. 2, 1993, pp. 261-280.

Young Lee et al., "Summary of RTCA SC-159 GPS Integrity Working Group Activities", Journal of the Institute of Navigation, vol. 43, No. 3, 1996, pp. 195-226.

* cited by examiner

GNSS POSITIONING USING PRESSURE SENSORS

BACKGROUND OF THE INVENTION

The embodiments of the present invention relate generally to the improvement of GNSS data using altitude data derived from a pressure sensor. Certain embodiments use pressure-sensor derived data as calibrated by GNSS data and/or as blended with GNSS data to provide an improved altitude determination.

Further embodiments of the invention generally relate to detection, use and/or mitigation of multipath signals for communication and especially navigation systems. Certain embodiments further relate to the detection, use and or mitigation of multipath signals for GNSS systems.

There is currently a need for improved accuracy of GNSS positioning in particular with respect to portable navigation devices providing mapping services to users. Currently, GNSS horizontal accuracy is not sufficient to provide an accurate user map location without using "map matching" techniques—that is, without guessing a user location based on the position of roads and other landmarks in the map, under the assumption that the user is constrained to a position within the road. Furthermore, current techniques are not sufficiently accurate to differentiate between closely spaced roads or stacked road conditions, for example underneath overpasses or where two roads are in an upper deck-lower deck configuration. There is thus a need to improve the accuracy of GNSS positioning systems to overcome these difficulties.

Furthermore, wireless communications systems generally experience an effect known as "multipath". "Multipath" refers to the reception of a non-line of sight signal from a signal source. Multipath signals may result, for example, from the reflection of a signal from a nearby reflector, such as the ground, a building face or the surface of a body of water. Multipath signals may also result when signals are significantly refracted. In general a non-reflected or refracted (straight line) signal is referred to simply as the "signal", "true signal" or "line of sight signal", whereas a reflected or refracted signal is referred to as a multipath signal. Since the multipath signal does not travel along the line of sight, it always arrives at the receiver later than the true signal.

Multipath signals, although sometimes useful, are often detrimental to signal quality. As an example, if the chipping frequency of a ranging signal is approximately 1 MHz, a multi path signal that travels along a reflected path with an additional 300 m length will arrive one chip later. When superimposed on the true signal, it distorts the received signal quality and can in some cases result in a complete loss of signal.

Figure 1:
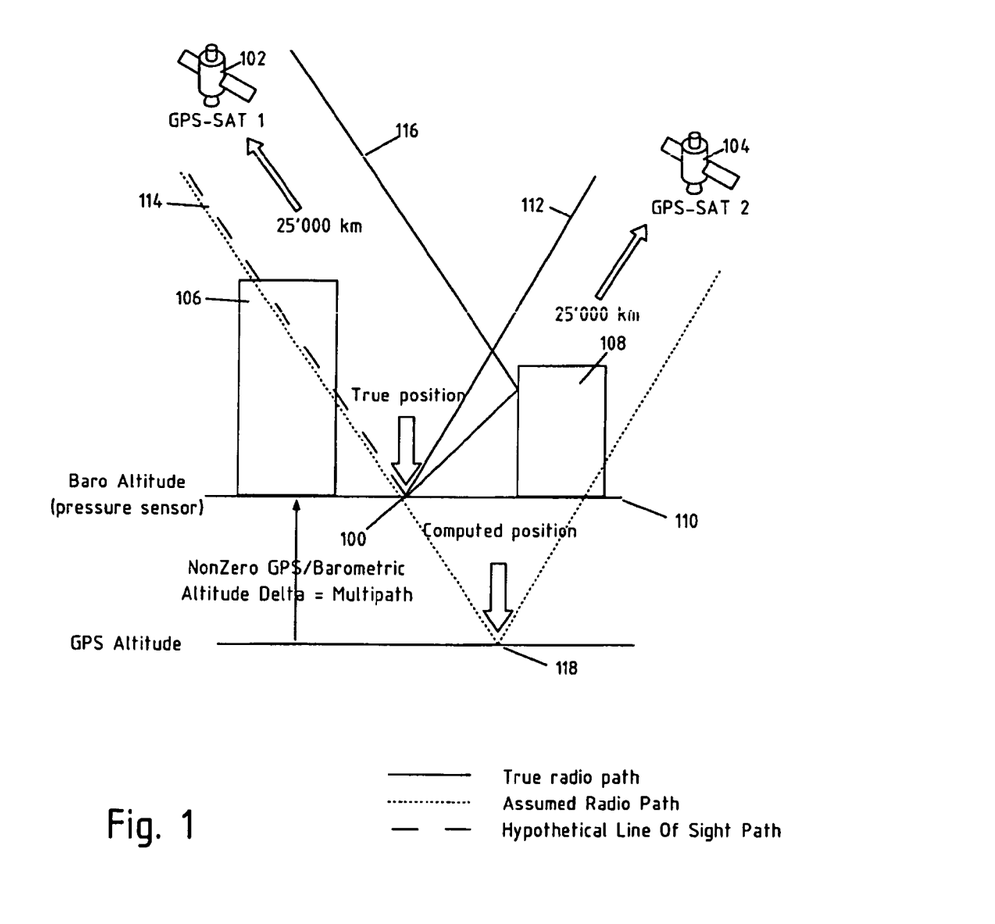
FIG. 1 illustrates a two-dimensional GNSS multipath problem and aspects of preferred embodiments.

Multipath problems are also detrimental to navigation systems, especially those that rely on the time of reception of received signals, such as used in Global Navigation Satellite Systems (GNSS) such as the Global Positioning System (GPS) or Galileo. FIG. 1, although an illustration of embodiments of the invention, and not of prior art, can help illustrate the detrimental effect of multipath signals in navigation schemes that rely on the time of reception of a signal.

FIG. 1 illustrates a two-dimensional satellite navigation case. A receiver 100 is located at a point 100 on the surface 110 of the Earth, which is marked in this case with the arrow indicating the "true position" of the receiver 100. The receiver 100 receives signals from satellites 102 and 104. In the two dimensional case where the receiver time with respect to satellite system time is accurately known, the time of reception of the two satellite signals is sufficient to compute a two-dimensional position fix. Receiver 100 is in an "urban canyon" environment, surrounded by buildings 106 and 108.

As illustrated in FIG. 1, receiver 100 is able to receiver a line of sight signal 112 from satellite 104, but line of sight signals 114 from satellite 102 are blocked by building 106. Receiver 100 receives instead multipath signals, here shown as a single signal 116 from satellite 102. Since the multipath signal 116 travels a longer distance to receiver 100 than the line of sight signal would have traveled, receiver 100 records a later time for the time of arrival of the signal.

The computed position 118 of the receiver based on the time of arrival of the signals of satellites 102 and 104 occurs at one of the intersection points of two circles defined with centers at the satellites and respective radii equal to the measured distance of the receiver 100 from the satellite. Because receiver 100 measures a greater distance from satellite 102 than the actual distance to satellite 102, the relevant intersection point is calculated lower than and to the right of receiver 100's true position.

In the past, multipath mitigation strategies have focused on signal processing techniques, such as the rejection of late arriving signals or the analysis of signal shape. These processing techniques are, unfortunately, limited in their ability to accurately remove the effects of multipath from the positioning solution provided by navigation receivers. Furthermore, traditional techniques have not been able to determine whether a line of sight signal is present, or whether only multipath signals are present. Thus, improved methods, systems and devices are called for.

SUMMARY OF THE INVENTION

Certain embodiments of the invention relate to a navigation receiver, comprising: a pressure sensor input; circuitry coupled to the pressure sensor input; wherein the circuitry is configured to use information from the pressure sensor input to improve a position fix. The navigation receiver may further comprise a pressure sensor connected to the pressure sensor input; wherein the relative measurements of the pressure sensor are more accurate than the absolute measurements of the pressure sensor. Optionally, the navigation receiver may comprise a GNSS receiver, wherein the circuitry is configured to calibrate an altitude derived from the pressure sensor using an altitude derived from the GNSS receiver. Further, the navigation receiver may be so configured that the altitude derived from the GNSS receiver used to calibrate the altitude derived from the pressure sensor has not been Kalman-filtered. Preferably, the circuitry comprises a central processing unit executing a position solution section, a velocity solution section, a Kalman filter and an atmospheric model section. Additionally, the circuitry coupled to the pressure sensor input may be configured to derive a first altitude from the pressure sensor input; and the circuitry coupled to the pressure sensor may be configured to blend the first altitude with a second altitude received from a GNSS sensor. Preferably, the circuitry coupled to the pressure sensor input is configured to carry out a complementary filter operation.

Further embodiments of the invention relate to a method for improvement of GNSS positioning, comprising: receiving a GNSS measurement from a primary GNSS system; deriving a first altitude from the GNSS measurement; deriving a second altitude from a pressure sensor input corresponding approximately in time to the GNSS measurement; and combining the first and second altitude measurements to obtain a blended altitude measurement. Optionally, the step of combining the first and second altitude measurements comprises executing a complementary filter operation. Preferably, the step of executing a complementary filter operation comprises filtering data related to the first altitude using a low-pass filter and filtering data related to the second altitude using a high-pass filter. Additionally, the second altitude can be derived using an atmospheric model.

Further embodiments of the invention relate to a portable navigation system, comprising: a GNSS sensor; a pressure sensor; and a microprocessor configured to use input derived from the GNSS sensor and the pressure sensor to provide a map location without using map-matching. Additionally, the portable navigation system may provide horizontal an accuracy of 10 meters or less in an urban canyon environment.

Optionally, the portable navigation system further comprises a machine-readable medium comprising software instructions that, when executed by the microprocessor, would perform a method comprising the steps of: computing a GNSS altitude; computing an altitude based on a measurement derived from the pressure sensor; and combining the GNSS altitude and the altitude based on a measurement derived from the pressure sensor to produce a blended altitude. The step of combining the GNSS altitude and the altitude based on a measurement derived from the pressure sensor preferably comprises using a complementary filter.

Still further embodiments of the invention relate to a portable vehicle navigation system, comprising: a GNSS sensor; a pressure sensor; and a microprocessor configured to use input derived from the GNSS sensor and the pressure sensor to provide a map location; and wherein the portable navigation system can differentiate between two roads in a stacked road condition. Furthermore the vehicle navigation system optionally provides a vertical accuracy of 10 meters or less under stacked road conditions.

Additionally, the vehicle navigation system further comprises a machine-readable medium comprising software instructions that, when executed by the microprocessor, would perform a method comprising the steps of: computing a GNSS altitude; computing an altitude based on a measurement derived from the pressure sensor; and combining the GNSS altitude and the altitude based on a measurement derived from the pressure sensor to produce a blended altitude. Preferably, the step of combining the GNSS altitude and the altitude based on a measurement derived from the pressure sensor comprises using a complementary filter.

Certain further embodiments of the present invention relate to navigation receivers, comprising: a physical sensor input; circuitry coupled to the physical sensor input; and wherein the circuitry is configured to use information from the physical sensor input for multipath mitigation. Such navigation receivers can be further configured such that the physical sensor input is adapted to be connected to a physical sensor, wherein the relative measurements of the physical sensor are more accurate than the absolute measurements of the physical sensor; wherein the physical sensor is a pressure sensor; and/or wherein the physical sensor input is adapted to be connected to an inertial sensor.

In certain embodiments the circuitry comprises central processing unit executing a position solution section, a velocity solution section, a Kalman filter and an atmospheric model section. Additionally, the navigation receiver can be configured such that the circuitry coupled to the physical sensor input is configured to derive first position-related data from the sensor input; and wherein the circuitry coupled to the physical sensor is configured to blend the first position-related data with second position-related data received from a GNSS sensor. The navigation receiver can be configured such that the circuitry coupled to the physical sensor input is configured to carry out a complementary filter operation.

Embodiments of the invention further relate to a method for multipath mitigation, comprising receiving a GNSS measurement; calculating a position based on the GNSS measurement; receiving a first position-related datum derived from a physical sensor input and corresponding approximately in time to the GNSS measurement; determining whether the position based on the GNSS measurement was significantly affected by multi path by using the first position-related datum The method can be extended to include situations wherein the step of determining whether the position based on the GNSS measurement was significantly affected by multipath further comprises using a second position-related datum derived from the physical sensor input and corresponding to a time previous to the time of the GNSS measurement. Furthermore, the method can be performed such that the step of determining whether the position based on the GNSS measurement was significantly affected by multipath comprises computing a difference between the first position-related datum and the second position-related datum. Preferably, the first position related datum is an altitude or an acceleration and optionally the altitude is calculated using an atmospheric model.

In certain embodiments, the method will further comprise the step of filtering the difference between the first position-related datum and the second position-related datum with a complementary filter having as an input a corresponding position-related datum derived from GNSS signals. Optionally, the complementary filter comprises a high-pass filter and a low-pass filter.

Other embodiments relate to a portable navigation system, comprising a GNSS sensor; a physical sensor; and a microprocessor configured to use input derived from the GNSS sensor and the physical sensor to perform multipath mitigation. The portable navigation system can be configured such that the physical sensor is a pressure sensor, and the system comprises a machine-readable medium comprising software instructions that, when executed by the microprocessor, perform a method comprising the steps of computing a GNSS position; computing a position change based on a measurement derived from the physical sensor; and comparing the position change against a threshold to determine whether the GNSS position is likely to be significantly affected by multipath. The position change preferably comprises a change in altitude; and the method advantageously further comprises augmenting the GNSS position with altitude information derived from the physical sensor through the use of a complementary filter.

DETAILED DESCRIPTION OF THE PREFERRED EMBODIMENTS

Numerous embodiments of the present invention relate to improving the accuracy of position fixes and the concept of "multi path mitigation" in navigation systems. As used herein, "multipath mitigation" means a lessening of detrimental effects of multipath signals.

In general, embodiments of the invention accomplish improved accuracy and multipath mitigation by using information, which may be any kind of information, usually encoded as a digital or analog signal, derived from a sensor that provides information from a source other than the primary GNSS system being used for position fixes. For example, if the sensor is provided to supplement a Galileo receiver, the sensor may be based on a GPS receiver. Here, the term "derived from" means "retrieved as the direct output of" or "modified from the output of". The sensor may also be a "physical sensor". A physical sensor is a device that senses the more immediate physical environment of the receiver, as opposed to a sensor that detects wireless signals broadcast by distant transmitters such as navigation satellites or remote pseudo-lites. Examples of physical sensors can include inertial sensors, altimeters, speedometers, etc.

A number of inventive concepts will become clear if explained in reference to a receiver embodiment that employs a pressure sensor to monitor altitude and uses information about the altitude to improve its position fix calculations. The pressure information relayed by the sensor provides physical information about the position and displacement of the receiver between GPS fixes. If multi path is experienced by the GPS section of the receiver, the calculated position will significantly vary from one fix to another. The fix will shift significantly in vertical and horizontal directions. The instantaneous shift (meaning the shift between two fixes adjacent in time, here assumed to be 1 second apart) can be in the order of meters horizontal and vertical. The sudden jump in position from one second to the other represents an acceleration incompatible with the actual acceleration capabilities of the user using the receiver. The difference between calculated GPS vertical position and altitude as measured by the pressure sensor is used as a multi path detection mechanism. In other embodiments, the GNSS position fixes are filtered using sensor data to improve their accuracy and to mitigate the effects of multipath and other errors.

This concept is illustrated in FIG. 1, which shows a two dimensional navigation system problem as described in the Background section. If the receiver 100 is in motion, as would be the case for a pedestrian or vehicle, it will experience sudden emphasis on multipath signals based on line-of-sight signal blockage. For example, if the receiver 100 is moving from building 108 in the direction of building 106, it will at some point experience a blockage of line-of-sight signal 114 and the reception of multipath signal 116. This can lead to a sudden shift in the calculated position of the receiver, for example, from the true position of the receiver 100 to the computed position 118.

Physical sensors can be used to detect these sorts of multipath effects. If the user were physically moved from a static position to a position 40 meters away within one second, and if one makes the assumption of a constant positive acceleration in the first half of the one second interval, and a negative constant acceleration in the second half of the one second interval, to come to rest after one second, the constant acceleration should be 160 m/s2 or +16 G for 0.5 s and −16 G for the remaining 0.5 s, with a maximum velocity of 288 km/h at 0.5 seconds. Such acceleration is highly unlikely for any receiver that is associated with the location of a human being. Thus, appropriate for any particular application, a threshold change can be chosen that can be used to determine whether or not a particular GNSS position fix is likely to be significantly affected by multipath. The choice of the threshold can depend, of course, on the expected velocity of the receiver as illustrated in the above example. Preferred embodiments will compare a calculated GNSS displacement with a vertical displacement measured, for example by means of a pressure sensor.

Currently available pressure sensors using, for example, MEMS (Micro electromechanical Systems) technology, have a resolution level in equivalent altitude of about 0.2 meters. One example of such a sensor is the SMD-500 manufactured BOSCH Sensortec. Such sensors have a relatively good dynamic response, sufficient to track stair climbing for example. It is generally possible using MEMS technology to determine the current floor of a user.

While pressure information is continuously varying due to weather conditions, the time constant of this variation is in tens of minutes. Pressure sensor information can thus be calibrated by the GNSS information. GNSS information is absolute accurate information, but with high noise level. Pressure derived altitude information is relative information, but with a quite accurate relative displacement. That is, GNSS positioning has a lower accuracy, but produces a position relative to known Earth-centered Earth-fixed coordinates. A pressure sensor produces a pressure relative to a standard which is slowly varying, but which can be assumed to be the same between any two GNSS fixes. The blending of both types can be done, for example, by a complementary filter or by a Kalman Filter. This will produce a more accurate altitude component of position which can be used to improve the overall fix.

In preferred embodiments, the pressure sensor will be calibrated using altitudes calculated directly from single position fixes rather than Kalman-filtered altitudes. The Kalman-filtered altitudes have lower noise, but some bias due to the smoothing effect over many measurements. The pressure sensor, on the other hand, has inherently low intersample noise, but provides only relative accuracy. It is therefore not advantageous to sacrifice absolute accuracy for better noise characteristics in the calibration standard.

The same technique, i.e. detecting the discrepancy between GNSS reported position and sensor-reported information over short intervals for multipath mitigation, can be used with other sensors, the most natural being accelerometers. Certain additional difficulties are created thereby, including that an accelerometer in some embodiment would need extra altitude information. In other embodiments, an accelerometer can be used to determine whether the average acceleration regardless of direction is consistent with an acceleration as determined by a GNSS system.

A pressure sensor, in contrast has a natural assumed displacement measurement direction (vertical). Accelerometers could be used to detect spurious acceleration, but the conversion of acceleration into a displacement equivalent is difficult. There may also be some spurious exception conditions, for example, when the accelerometer detects an impact shock. Also, vertical acceleration will be much less than horizontal one, so it will generally be more difficult to detect between true and false acceleration.

In certain embodiments, a pressure sensor can be calibrated using GPS information to derive an accurate altitude. This pressure sensor calibration is not necessary for multi path mitigation, as one is interested in the sudden, relative variations or lack thereof in the altitude, but calibration can be done where absolute altitude measurements are desirable. In order to avoid the "pollution" of the pressure sensor calibration with multipath effects, the calibration has a very long time constant (in the order of 30 to 100 seconds minimum). That is, calibration (or setting of the baseline pressure relative to which displacements are measured) takes place over many GNSS fix cycles. A receiver using a pressure sensor system can also be configured to disable or suspend the calibration operation if the GPS position is recognized as being of low quality, for example, through a determination that pseudorange residuals are too high, or that vertical residuals are too high. In such a case, the operation can be configured to coast, using previous calibration values.

In practice, usually only one satellite at a time will be afflicted by transitory multipath. The above-described techniques can detect which satellite is at fault, simply by measuring the residual of each satellite as compared with the propagated position from the inertial/pressure sensors. This allows the receiver to make the position fix more accurate by rejecting measurements from the satellite afflicted with multipath or by coasting previous values.

Alternatively, an extra pseudorange error for one satellite can be measured against the data derived from a physical sensor, at the accuracy of the physical sensor. This allows a check of every satellite for accuracy against this reference, without depending on group-based techniques such as RAIM (Receiver Autonomous Integrity Monitoring).

Figure 2:
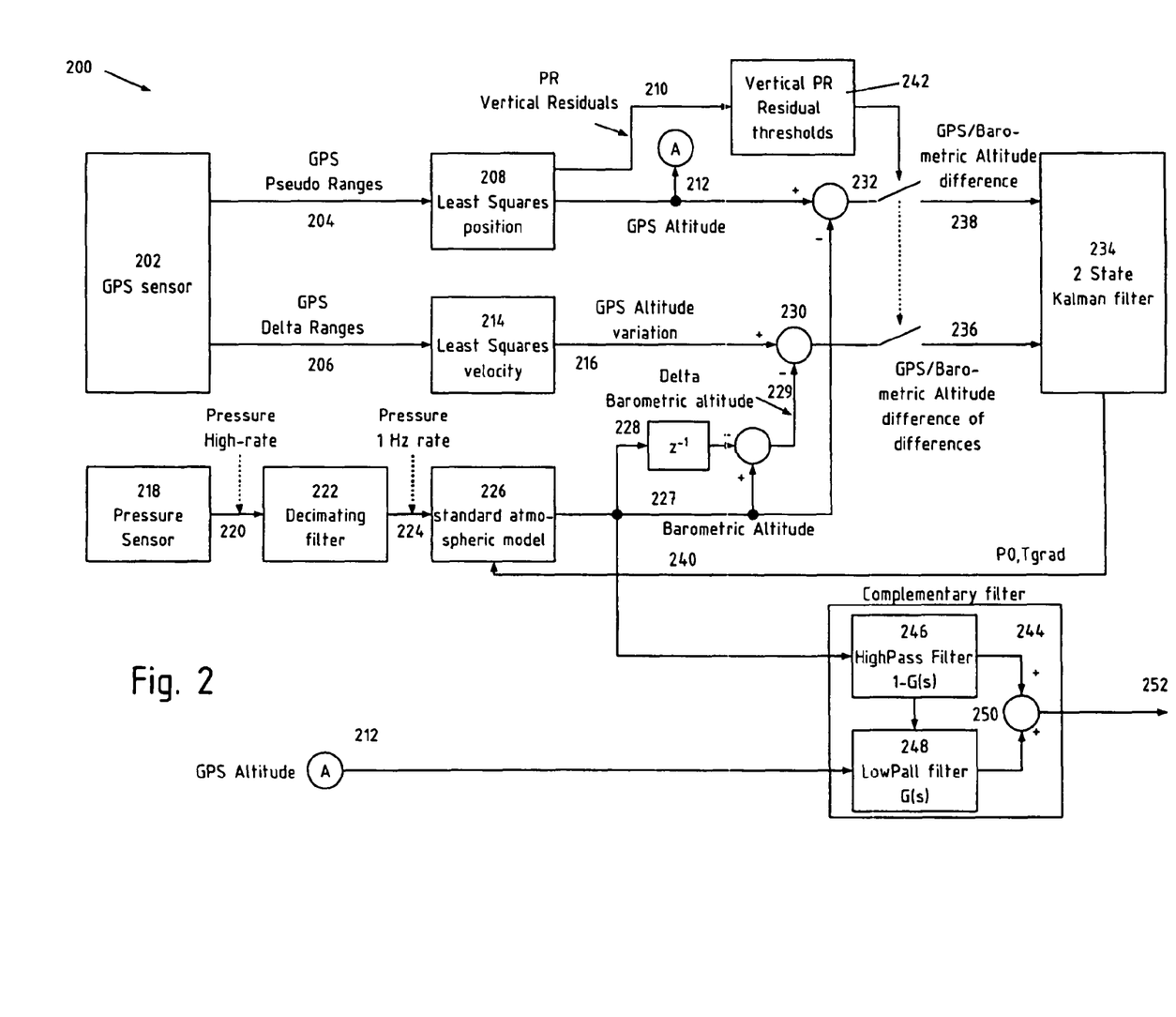
FIG. 2 is a GPS block diagram indicating a GPS system architecture according to certain embodiments.

FIG. 2 is a GPS block diagram indicating a GPS system architecture according to certain embodiments according to an embodiment of the present invention. FIG. 2 has a GNSS sensor 202, shown here as a GPS sensor, which acquires and tracks satellites and produces information relating to ranging measurements. Receiver architecture 200 also comprises a sensor 218, shown here as a pressure sensor. Data derived from the GPS sensors and pressure sensors are filtered with a two-state Kalman filter 234 and a complementary filter 244 in the manner described below. It will be apparent that the filter embodiments as described herein can be significantly rearranged while still performing a function that will achieve the result intended by this disclosure.

GPS sensor 202 generates GPS pseudorange measurements at 204 and GPS delta pseudorange measurements at 206. The GPS pseudorange measurements are passed to a position solution section 208, which can be a least-squares type position solution algorithm as shown. Similar to the pseudorange measurements, delta pseudorange measurements are passed at 206 to a velocity solution section 214, which may be a least squares velocity solution section as shown. Here, the term "section", refers generally to code, circuitry or both configured to perform a certain function, usually being identifiable as a method, object or logical grouping of software instructions. If implemented as code, a section will generally be executed by an integrated circuit having a central processing unit, such as a microprocessor, microcontroller or application specific integrated circuit with an embedded CPU core. Software instructions for such sections are embedded in a machine readable medium, which can comprise, for example, a non-volatile memory such as Flash memory as an integrated circuit chip or portion of a chip.

Position solution section 208 outputs pseudorange vertical residuals at 210 and GPS-calculated altitude at 212 (shown as point A). The output 210 is connected to threshold section 242. Threshold section 242 determines whether the vertical pseudorange residuals are within acceptable limits, and if not, stops the input of data to Kalman filter 234 using switches 238 and 236, which are preferably the calculated vertical software functions. The inputs can be suspended if pseudorange differences exceed a certain threshold, as calculated by threshold section 242, i.e. if it is likely that multipath has reduced the accuracy of a particular measurement to a significant extent. This allows the Kalman filter to coast and prevents the filter, and ultimately atmospheric model section 226, from being too heavily influenced by multipath distorted position fixes. GPS altitude output 212 is also differenced at 232 with a barometric altitude output 227 from atmospheric model section 226.

The resulting difference is fed to an input of Kalman filter section 234, here shown as a two-state Kalman filter, over switch 238. Here the term "input", when used as a noun, means connection suitable for conveying information, such as a software function, or equivalent hardware such as a wire or interconnect, or a group of wires or interconnects arranged as a bus, for example. To improve the accuracy of the system, the Kalman filter section 234 is used to estimate $P_0$ and $T_{grad}$ which are parameters that can be used by atmospheric model section 226. The Kalman Filter observables are, for example: (1) altitude difference between the pressure sensor and GPS; and (2) the altitude variation difference between pressure sensor and vertical velocity (delta range), between two fixes. The internal states are: (1) $P_0$, the pressure at mean sea level (2) $T_{grad}$, the lapse in degrees Celsius/km. The process model of $P_0$ and $T_{grad}$ is a random walk, with a time constant to be adjusted on the weather conditions. Of course, Kalman filters with more or fewer states are possible, as are embodiments with no Kalman filters.

Variation in GPS altitude is output at 216 from velocity solution section 214 and differenced with barometric altitude differences 229 at 230. The resulting double difference is input at 236 to Kalman filter section 234. The altitude difference is generated by the output of pressure sensor 218 by passing it at 220 to a decimating filter 222, the output of which is in turn passed at 224 to an atmospheric the model 227 is differenced with a singlemodel section 226. The series output of stage delayed version of itself 228 to produce barometric altitude differences.

The standard atmosphere defined by the document US Standard Atmosphere 1976 (NOAA/NASA) "NOAA SIT 76-1562" can be used as a starting point for atmospheric model section 226. It defines a hydrostatic formula that relates atmospheric pressure and altitude, introducing two parameters, the pressure at sea level ($P_0$=1013 hPa), and the lapse, or temperature variation with altitude ($T_{grad}$=6.5 degrees C./km). The GPS altitude can be used for calibrating these two parameters. Barometric altitude is centered at the mean sea level, whereas the GPS altitude is defined above the geoidal ellipsoid as defined in the WGS84 reference system.

The standard model referred to above has the form:

$$P = P_0 \left[ \frac{T_0}{T_0 + T_{grad}(h - h_0)} \right] \exp\left( \frac{g_0 M}{R^a T_{grad}} \right)$$

wherein
 $P_0$=Static reference pressure (Pascal)
 $T_0$=Standard temperature (Kelvin)
 $T_{grad}$=Standard temperature lapse rate (Kelvin per meter)
 $h_0$=Reference altitude (meters)
 $R^a$=Universal gas constant for air
 $g_0$=Gravitational constant and
 M=Molar mass of Earth's air.

The atmospheric model section 226 takes as inputs 240, for example, the pressure at sea level $P_0$ and the temperature gradient $T_{grad}$. These are Kalman filter states as calibrated by the GPS altitude and vertical velocity solutions, and are received from Kalman filter section 234.

The barometric altitude has accurate relative information, with meter level or less altitude noise, but not particularly accurate absolute altitude. It is, however, quite responsive to fast altitude variations. In contrast, the GPS altitude has a good non-biased accuracy under nominal reception conditions, but has quite high altitude noise, which can be as large as 20 meters.

A blending filter implemented with a complementary filter architecture is used in the embodiment shown in FIG. 2 to combine both types of information. The barometric altitude output 227 from atmospheric model section 226 is input to complementary filter 244 and passed to a high-pass filter 246. The GPS altitude 212 is also input to complementary filter 244 but passed to a low-pass filter 248. The outputs of both filters are summed at 250 and output as combined GPS/Barometric altitude information at 252.

A complementary filter can be defined as a filter that receives two types of information and performs a filtering operation that advantageously uses complementary characteristics of both information types to produce a single output with improved characteristics. A complementary filter is advantageously used when, as here, the same information is available through different sensors, each of which has quite different noise characteristics. The absolutely low frequency accurate information (GPS information) is filtered with a low-pass filter, and the relatively fast, accurate pressure sensor-derived altitude is high-pass filtered. Preferably, the response of both filters is carefully controlled such as, for example, by ensuring that the sum of the amplitude responses of the low pass and high pass filters are exactly equal to one over the whole frequency range, effectively guaranteeing an "all pass" characteristic for the parameter of interest (altitude), but with differing noise processing. This technique as shown in FIG. 2 is in fact a Wiener filtering technique that works well, as the required noise-like behavior of the signal is well-enforced (the "signal" to optimize is actually the noise on both sensors). It is worthwhile to note that this structure does not necessitate a static position for the receiver; the data blending occurs even if there is a significant vertical component of motion. The order of the complementary filter is either first order, or can be higher order if more separation between the noise sources is necessary.

The complementary filter should take altitude on both sides of the filter. The natural information from the pressure sensor is obviously pressure, and the standard atmospheric pressure formula can be used. It could be used as is, as the altitude/pressure gradient of the model is not too sensitive to $P_0$ and $T_{grad}$. The $P_0$ is effectively eliminated by the complementary filter.

Using certain embodiments, the absolute altitude can be measured with an accuracy of 5 meters or less, specifically about 2-3 meters, good enough to resolve between stacked roads. A typical example is the Bay Bridge in the Bay Area, with an interdeck vertical distance of 10 meters. The absolute accuracy is good enough to unambiguously discriminate between levels.

Stacked roads include two roads or freeways superposed on top of each other, usually going in the same direction (for example, Upper and Lower Wacker, in Downtown Chicago). The upper road is almost in open sky conditions, so the quality of the GNSS fix is quite good. However, a GNSS receiver mounted on a vehicle on the lower road level will experience quite large multipath distortion, because of the metallic structures in the immediate environment, diminishing the quality of the fix significantly.

Usually these superposed roads do not have the same exits, and the lack of knowledge concerning which road the vehicle is actually on creates major errors on the routing instructions (often, the user will be asked to exit at an exit that is accessible only on the other level).

Other similar situations include a freeway on a bridge, with a parallel road running underneath or a cloverleaf structure, with an exit going up or down in altitude compared to the direct straight line. An accurate altitude allows an early warning to the driver that he or she is on the wrong exit, even if the wrong road is running parallel to the desired road, too close to be safely discriminated with the GPS horizontal accuracy only.

The vertical accuracy of a road survey using state of the art using Mobile Mapping Technologies, either terrestrial (using DGPS, INS, and 360 degrees cameras for stereoscopic remote georeferencing) or airborne (using DGSP, INS, and LIDAR) is about 0.1 meters to 0.3 meters of absolute accuracy. This information is not necessarily inserted into the mapping database as delivered to the end customer as in Personal Navigation Devices (PND), because of unusability in the final PND. The described absolute altitude determination technique make availability of accurate vertical mapping information valuable, especially in the case of stacked roads.

In order to make altitude mapping useful for such situations, embodiments of the invention provide accurate absolute altitude for determining along which level of stacked roads the car is actually moving. The reported Absolute altitude Accuracy needs to be consistently better than half the minimum distance between the stacked roads (which is about 9-10 m).

Figure 3:
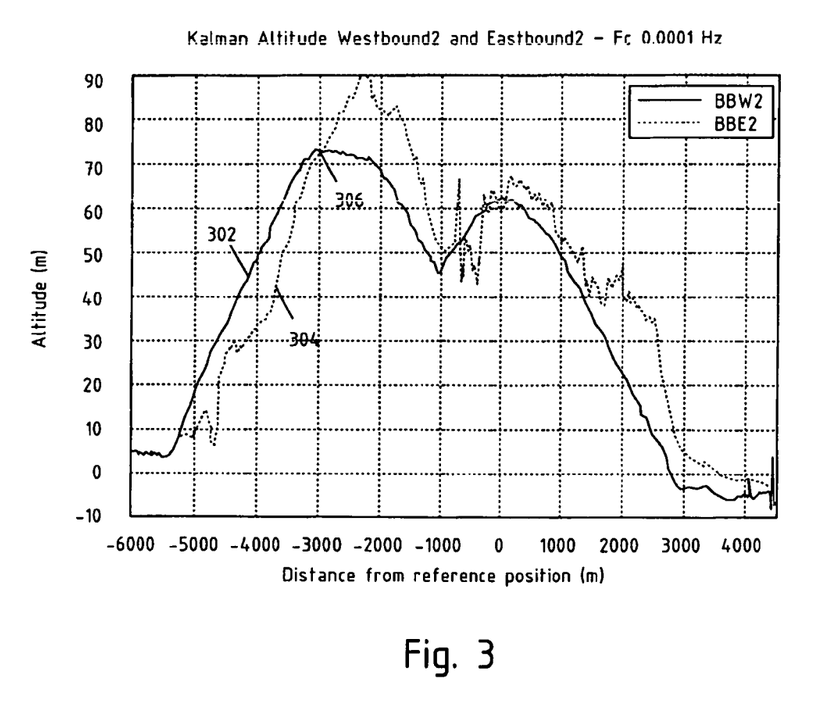
FIG. 3 is a graph showing the performance of a traditional GPS receiver under stacked road conditions.
Figure 4:
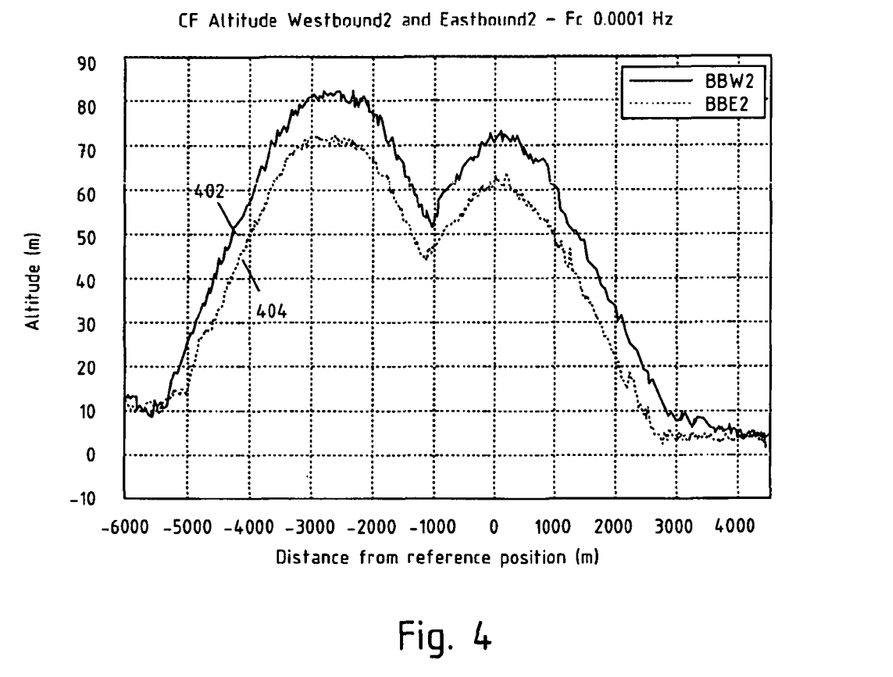
FIG. 4 is a graph showing the performance of an embodiment of the invention under stacked road conditions.
Figure 5:
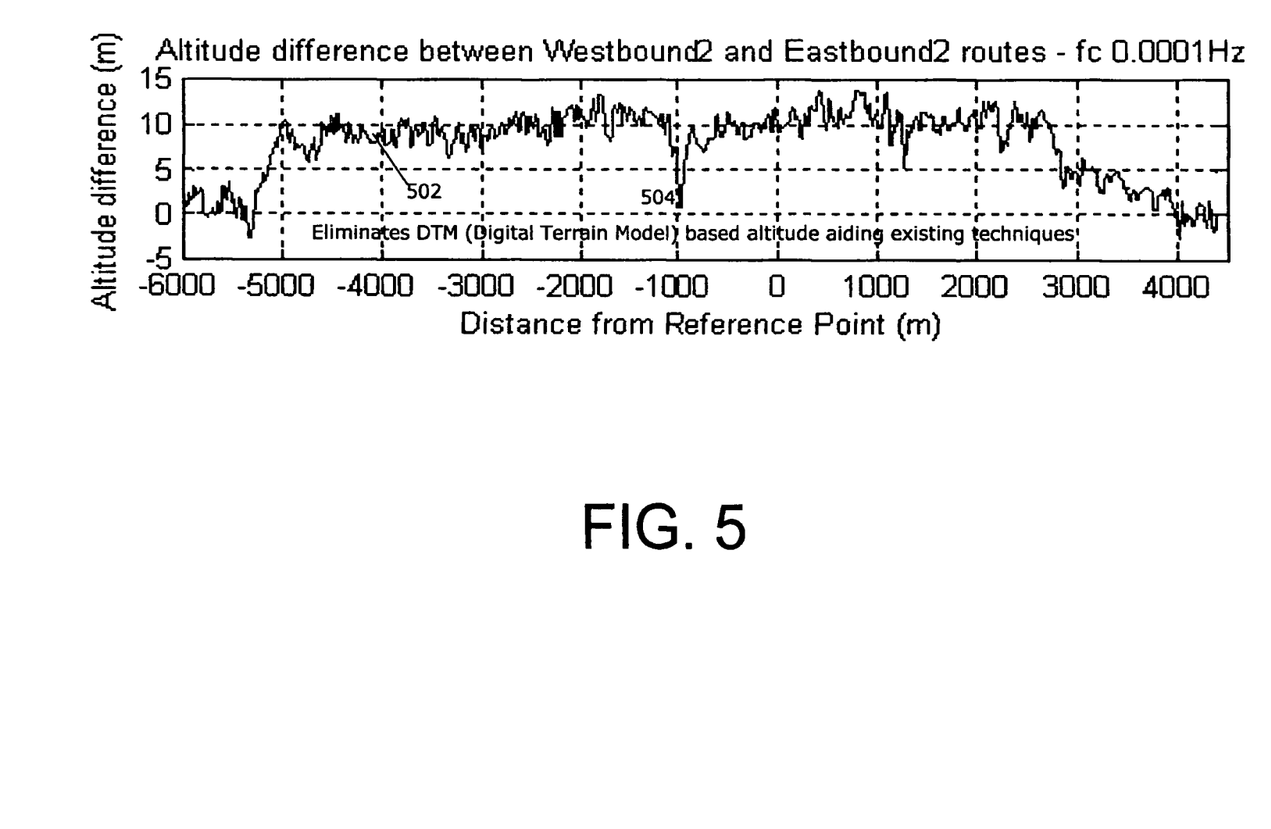
FIG. 5 is another graph illustrating the performance of an embodiment of the invention under stacked road conditions.

A test of an embodiment appropriate for such situations is explained in reference to FIGS. 3-5. In the presently described test, an SMD-500 pressure sensor is polled at 10 hertz through a DevASys 12C-USB converter and collected by NemeriX® GHS host software. A GPS receiver was mounted on the roof of a test vehicle and its output was also collected by the NemeriX® GHS software. The software outputs log messages containing the sensor readings and the GPS readings to a log file that is analyzed in the laboratory using Matlab®.

The test was performed on the Bay Bridge on Interstate 80 between San Francisco and Alameda Counties. The length of the bridge is 23,000 feet (4.5 miles). The bridge comprises a westbound and eastbound portion. The West Bay Suspension Bridge has a Length 9260 feet (2822 meters), and a vertical clearance of 220 feet (58 meters). The East Bay Cantilever Bridge has a length of 10,176 feet (3101 meters), and a vertical clearance 191 feet (67 meters). Spacing between the upper (westbound) deck and the lower (eastbound) deck is about constant at ten meters for most of the length of the bridge. Because the lower level does not have a clear view of the sky, receivers traveling eastbound experience significant multipath interference.

FIG. 3 shows a graph 300 of performance of a standard GPS receiver without using pressure sensor data. The graph 300 shows GPS altitude (y-axis) as measured along the length of the bridge (x-axis). GPS altitude readings for both the westbound (302) and eastbound (304) decks are shown.

The GPS receiver heading westbound has a clear view of the sky and thus tracks the altitude smoothly, which results in curve 302. Because of multipath the Kalman filter altitude for the eastbound deck, curve 304, shows severe overshoots causing the east bound altitude to appear greater than it actually is by more than 10 meters. This makes it very difficult to distinguish between the two levels. At point 306, the two cures actually cross, and the eastbound deck appears to be above the westbound deck.

FIG. 4 shows the improvement when using embodiments of the present invention. FIG. 4 shows a graph 400 of GPS readings along the Bay Bridge using pressure sensor data. Graph 400 again shows altitude readings (y-axis) against horizontal distance along the bridge (x-axis). Curve 402 reflects westbound (upper deck) readings, and curve 404 reflects eastbound (lower deck) readings. These readings are the output of a complementary filter designed in accordance with techniques disclosed in reference to FIGS. 1 and 2. As seen in FIG. 4, the lower deck readings are consistently below the upper deck, allowing for distinction between the two. It is also important to note that not only the relative accuracy between the upper and lower decks was improved by blending pressure sensor data with GPS data; but also the absolute accuracy was improved.

For the measurements as recorded in FIG. 4, the altitude readings were calibrated using the output of a least squares position solution, not the output of a Kalman filtered position solution. The unfiltered least squares solution has high noise but no bias. The Kalman filter, on the other hand, is far smoother (less noise), but has a bias generated by its smoothing effect.

FIG. 5 shows a graph 500 of the difference 502 between measurements on the upper and lower decks (y-axis) made with pressure sensor aided GPS receiver according to FIG. 4, along the length of the bridge (x-axis). FIG. 5 shows that the difference is fairly constant around 10 meters, with a dip 504 in the middle where the bridge reflects the altitude difference of two levels at Treasure Island.

It is envisioned that the embodiments of the invention will also be useful for pedestrian navigation in narrow and winding streets. This includes so-called "last mile" navigation (navigation from the car to the building) as well as pedestrian tourism in cities (reliable turn-by-turn navigation in very narrow streets). Such navigation can not rely on map matching techniques, since pedestrians are not constrained to roads. Therefore, the horizontal accuracy must be better than half the typical distance between two streets in narrow urban environment.

By using per satellite multipath detection, flagging, and compensation as described herein based on difference between physical world (pressure sensor) and GPS measurements, effective pedestrian navigation can be implemented. A multipath-free altitude Kalman filter is generated by GPS and pressure sensor measurement blending. This eliminates the DTM (Digital Terrain Model) based altitude aiding in existing techniques.

Multipath mitigation can be accomplished on a per satellite/per pseudo-range basis MP detection by using probability data association techniques. A 1-D position fix can be performed using pressure sensor data and knowledge of time. A Kalman Filter is used to estimate of the vertical multipath offset for each satellite. A second horizontal Kalman filter is used to generate corrected/deweighted pseudo ranges. This is the equivalent of having an extra satellite with good intermeasurement noise characteristics located at the center of the Earth, and results in a better position more often with an extra virtual satellite (only 3 satellites are required for 3-D position). Altitude aiding information can be inserted in the altitude aiding port of the Kalman Filter.

Using the virtual satellite provided by the pressure sensor it is possible to determine the variation of pseudo-ranges individually per satellite, not just as a global position error. In an urban canyon environment, for example, there will usually be at least two satellites that are not affected by multipath. It is therefore possible to do a 1-D position fix in the vertical dimension with these two satellites, if an approximate user horizontal position is known. The position solution results in an altitude and a local clock bias. The difference between the predicted position and the actual position for a given satellite is then used as the input variable to a weighting function that is used to weight the actual measured pseudorange in the Kalman filter. A 1-D position fix can be repeated for all available satellite combinations. The satellites with multipath will be automatically rejected because of the weighting functions.

Once the altitude is known, a horizontal pseudorange error can be calculated, since the satellite elevation is known via ephemeris data. The horizontal pseudorange error is passed to a separate horizontal Kalman filter. One can then predict using a pressure sensor the position and clock at time t+1.

Figure 6:
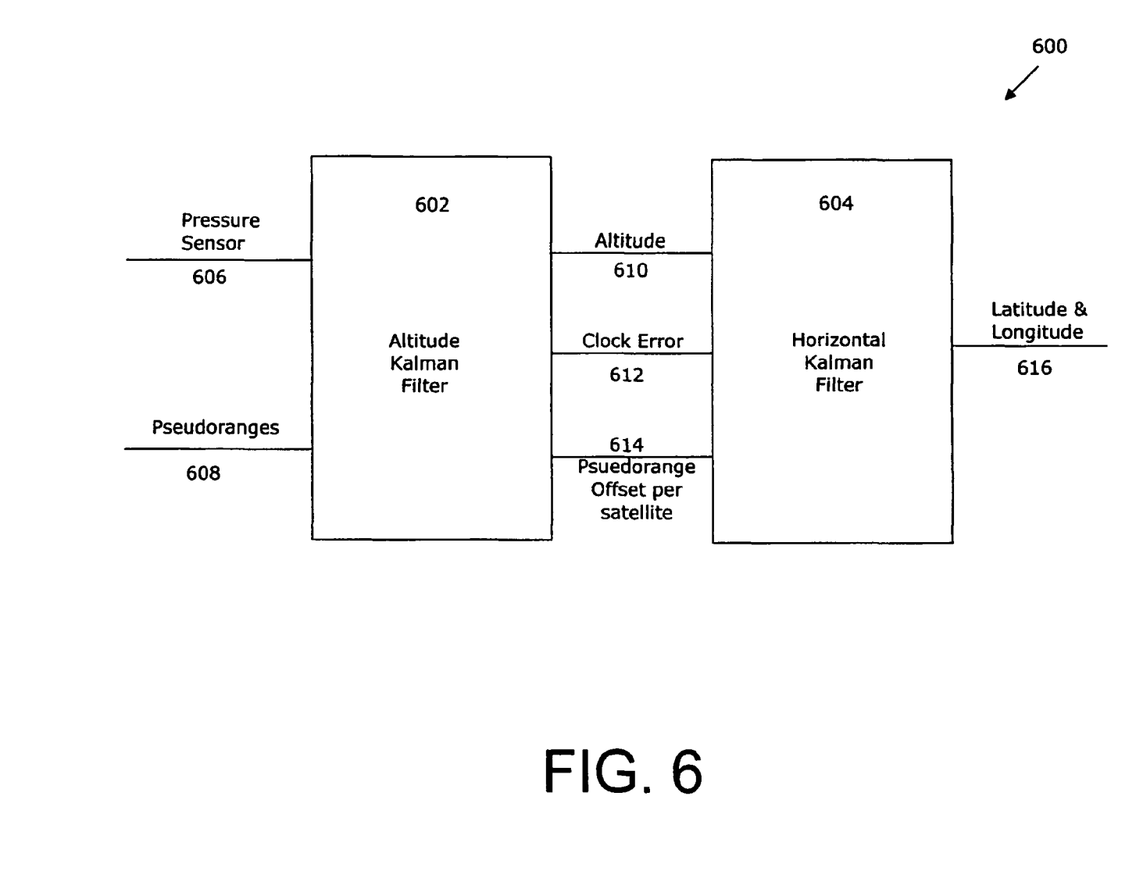
FIG. 6 is a system diagram showing a two Kalman-filter embodiment.

FIG. 6 shows a two Kalman filter embodiment 600 of the present invention useful for generating a navigation solution. Kalman filter 602 is an altitude Kalman filter, which uses pressure sensor values to produce a more accurate GNSS altitude and estimate horizontal pseudorange errors. Kalman filter 604 is a horizontal Kalman filter that produces a latitude and longitude.

Altitude Kalman filter 602 receives pressure sensor information at input 606 and pseudorange values per available satellite at input 608, and outputs altitude information at output 610, local clock bias at output 612 and horizontal pseudorange offset estimates at output 614, as calculated, for example, using 1-D vertical position fixes as described above. Horizontal Kalman filter 604 receives these as inputs and, using the data in combination with actual pseudoranges (not shown) calculates a final latitude and longitude, which is presented to the user along with the filtered altitude information.

In another embodiment, the pressure sensor is simply used to detect when a sudden change in vertical position takes place for a particular satellite, and the corresponding satellite can be blocked or deweighted.

Embodiments of the invention are also envisioned to be useful for indoor navigation, where the resolution of the pressure sensor aided navigation solution is enough to determine which floor of a building the user is on. It is much more accurate than the GNSS solution only, that will be even better for vertical positioning.

As it will be apparent to a person of skill in the art, the above-described embodiments can be modified in any of a variety of ways while not departing from the core teachings of the invention. The above-described embodiments are not intended as any way to be a limitation or disclaimer of subject matter, but rather intended to inform the following claims.

The invention claimed is:

1. A navigation receiver comprising:
    a pressure sensor configured to provide a pressure sensor signal;
    a GNSS receiver configured to provide pseudoranges;
    a microprocessor configured to compute: (1) a GNSS altitude and a vertical pseudorange residue derived from the pseudoranges, (2) a barometric altitude derived from the pressure sensor signal, based on an atmospheric model, and (3) a double difference in altitude based on a difference between a GNSS altitude variation and a barometric altitude difference; and
    a Kalman filter configured to estimate one or more parameters of the atmospheric model, using at least the double difference in altitude as an input to the Kalman filter.

2. The navigation receiver of claim 1, wherein the microprocessor is further configured to:
    determine whether the vertical pseudorange residue exceeds a threshold; and
    suspend the Kalman filter, if the vertical pseudorange residue is determined to exceed the threshold, to prevent updating the atmospheric model.

3. The navigation receiver of claim 1, further comprising:
an altitude Kalman filter coupled to the pressure sensor and the GNSS receiver, wherein the altitude Kalman filter comprises a first input port coupled to the pressure sensor signal, a second input port coupled to the pseudoranges, and a first output port for providing an altitude signal; and
a horizontal Kalman filter coupled in series to the altitude Kalman filter, wherein the horizontal Kalman filter comprises a first input port coupled to the altitude signal, and an output port for providing a longitude and a latitude.

4. The navigation receiver of claim 3, wherein the altitude Kalman filter further comprises a second output port for providing a clock error and the horizontal Kalman filter further comprises a second input port coupled to the clock error.

5. The navigation receiver of claim 4, wherein the clock error comprises a local clock bias.

6. The navigation receiver of claim 4, wherein the altitude Kalman filter further comprises a third output port for providing a pseudorange offset per satellite and the horizontal Kalman filter further comprises a third input port coupled to the pseudorange offset per satellite.

7. The navigation receiver of claim 3, wherein the altitude Kalman filter further comprises a second output port for providing a pseudorange offset per satellite and the horizontal Kalman filter further comprises a second input port coupled to the pseudorange offset per satellite.

8. A method in a navigation receiver comprising:
providing a pressure sensor signal from a pressure sensor;
providing pseudoranges from a GNSS receiver;
computing (1) a GNSS altitude and a vertical pseudorange residue derived from the pseudoranges, (2) a barometric altitude derived from the pressure sensor signal, based on an atmospheric model, and (3) a double difference in altitude based on a difference between a GNSS altitude variation and a barometric altitude difference; and
estimating, with a Kalman filter, one or more parameters of the atmospheric model, using at least the double difference in altitude as an input to the Kalman filter.

9. The method of claim 8, further comprising:
determining whether the vertical pseudorange residue exceeds a threshold; and
suspending the Kalman filter, if the vertical pseudorange residue is determined to exceed the threshold, to prevent updating the atmospheric model.

10. The method of claim 8, further comprising:
Kalman filtering, with an altitude Kalman filter, the pressure sensor signal from a first input port and the pseudoranges from a second input port to provide an altitude signal from a first output port; and
Kalman filtering, with a horizontal Kalman filter coupled in series with the altitude Kalman filter, the altitude signal from a first input port to provide a longitude and a latitude at an output port.

11. The method of claim 10, further comprising:
generating a clock error from a second output port of the altitude Kalman filter; and
receiving the clock error at a second input port of the horizontal Kalman filter.

12. The method of claim 11, wherein the clock error comprises a local clock bias.

13. The method of claim 11, further comprising:
generating a pseudorange offset per satellite from a third output port of the altitude Kalman filter; and
receiving the pseudorange offset per satellite from a third input port of the horizontal Kalman filter.

14. The method of claim 10, further comprising:
generating a pseudorange offset per satellite from a second output port of the altitude Kalman filter; and
receiving the pseudorange offset per satellite from a second input port of the horizontal Kalman filter.

15. A navigation receiver comprising:
means for providing a pressure sensor signal;
means for providing pseudoranges;
means for computing (1) a GNSS altitude and a vertical pseudorange residue derived from the pseudoranges, (2) a barometric altitude derived from the pressure sensor signal, based on an atmospheric model, and (3) a double difference in altitude based on a difference between a GNSS altitude variation and a barometric altitude difference; and
mean for estimating, with a Kalman filter, one or more parameters of the atmospheric model, using at least the double difference in altitude as an input to the Kalman filter.

16. The navigation receiver of claim 15, further comprises:
means for determining whether the vertical pseudorange residue exceeds a threshold; and
means for suspending the Kalman filter, if the vertical pseudorange residue is determined to exceed the threshold, to prevent updating the atmospheric model.

17. The navigation receiver of claim 15, further comprising:
means for altitude Kalman filtering the pressure sensor signal and the pseudoranges to provide an altitude signal; and
means for horizontal Kalman filtering, with a horizontal Kalman filter coupled in series with an altitude Kalman filter, the altitude signal to provide a longitude and a latitude.

18. The navigation receiver of claim 17, further comprising:
means for generating a clock error from the means for altitude Kalman filtering; and
means for receiving the clock error from the means for horizontal Kalman filtering.

19. The navigation receiver of claim 18, wherein the clock error comprises a local clock bias.

20. The navigation receiver of claim 18, further comprising:
means for generating a pseudorange offset per satellite from the means for altitude Kalman filtering; and
means for receiving the pseudorange offset per satellite from the means for horizontal Kalman filtering.

21. The navigation receiver of claim 17, further comprising:
means for generating a pseudorange offset per satellite from the means for altitude Kalman filtering; and
means for receiving the pseudorange offset per satellite from the means for horizontal Kalman filtering.

22. A non-transitory machine-readable medium comprising software instructions for a navigation receiver, the software instructions comprising code to:
provide a pressure sensor signal from a pressure sensor;
provide pseudoranges from a GNSS receiver;
compute (1) a GNSS altitude and a vertical pseudorange residue derived from the pseudoranges, (2) a barometric altitude derived from the pressure sensor signal, based on an atmospheric model, and (3) a double difference in altitude based on a difference between a GNSS altitude variation and a barometric altitude difference; and estimate, with a Kalman filter, one or more parameters of the atmospheric model, using at least the double difference in altitude as an input to the Kalman filter.

* * * * *